Nov. 9, 1965    A. CHEVALIER ETAL    3,217,282
CONNECTOR FOR REINFORCED FLEXIBLE CONDUIT
Filed Feb. 28, 1963    2 Sheets-Sheet 1
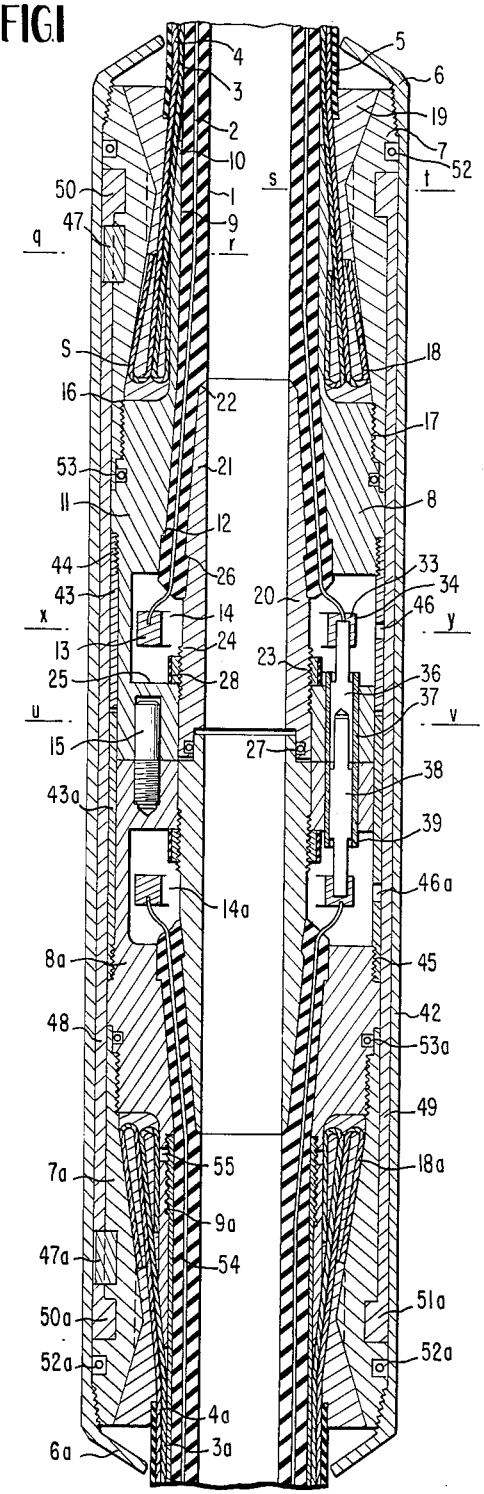
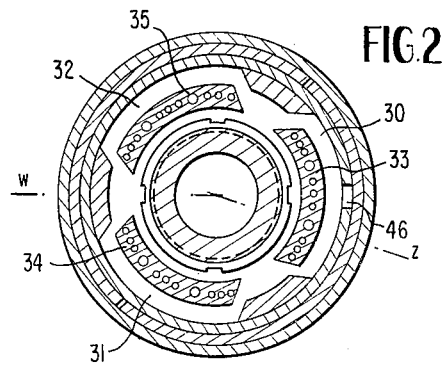
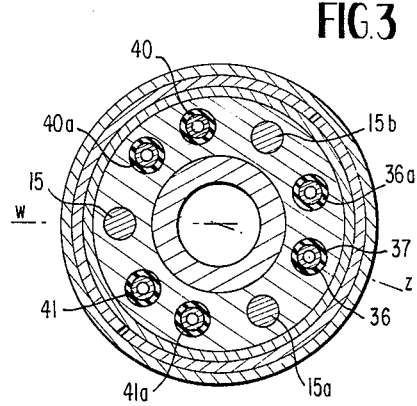
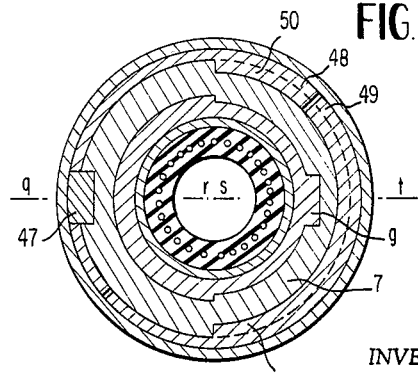
INVENTORS
ANDRE CHEVALIER
JACQUES DELACOUR
BY   Krafft & Wells
ATTORNEYS

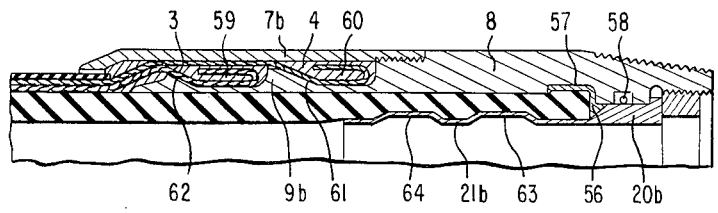
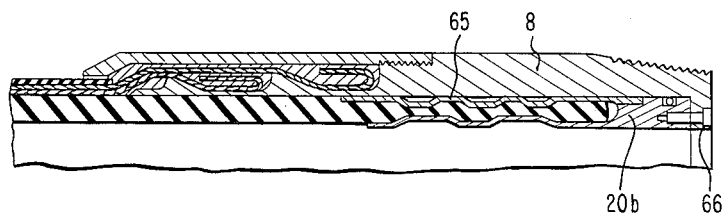
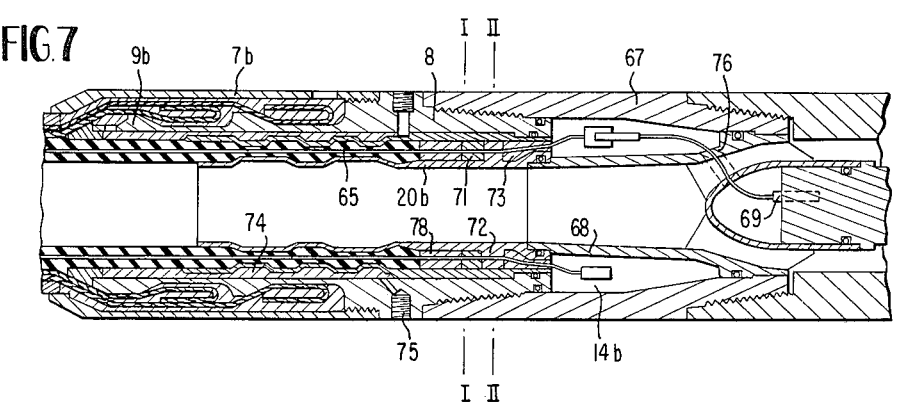
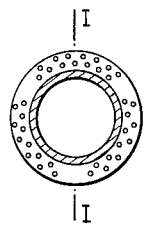
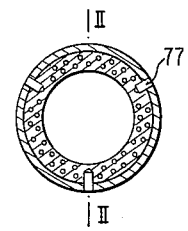
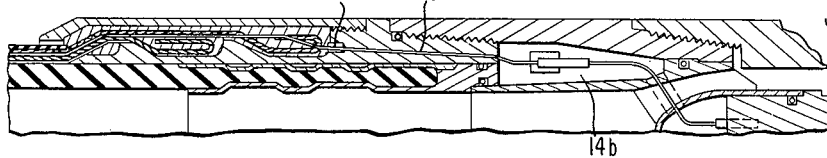

United States Patent Office 3,217,282
Patented Nov. 9, 1965

3,217,282
CONNECTOR FOR REINFORCED FLEXIBLE CONDUIT
André Chevalier, Pantin, and Jacques Delacour, Paris, France, assignors to Institut Francais du Petrole, des Carburants et Lubrifiants, Rueil-Malmaison, Seine-et-Oise, France
Filed Feb. 28, 1963, Ser. No. 261,610
Claims priority, application France, Mar. 1, 1962, 889,669
5 Claims. (Cl. 339—15)

This invention relates to a connector for reinforced flexible conduit or tubing, more particularly suitable for connecting tubing lengths intended for instance to replace the conventional drill string in drilling operations or to constitute a pipe line for oil or gas conveyance, said pipe line being laid in a simple manner by unreeling of successive tubing lengths from storage reels and connection thereof to one another, and being easily removed by disconnecting said tubing lengths and winding each one on a corresponding reel.

The type of connector according to this invention is of particular interest for the coupling of reinforced tubing lengths having a structure adapted to resist high internal pressures and/or high traction strains and comprising for instance two reinforcements, each of which consists of two interlaced layers of metallic wires or wire-strands, and metallic conductors.

It is an object of this invention to provide a connector whereby is achieved the simultaneous transmission from one tubing length to the adjacent one of the traction and torsional strains as well as the electric power.

It is another object of this invention to provide for the aforesaid transmissions through a fluid-tight connector withstanding high gas or liquid pressures with efficient sealing of the various parts thereof and particularly of the connections between electric conductors.

Still other objects and advantages of this invention will be appreciated upon consideration of the following specification and the accompanying drawings, which constitute a part of said specification and wherein:

FIGURE 1 shows a longitudinal section of a first embodiment of connector according to this invention, along lines w–z of FIGURES 2 and 3;

FIGURE 2 shows a cross-section taken on a line x–y of FIGURE 1;

FIGURE 3 shows a cross-section taken on a line u–v of FIGURE 1;

FIGURE 4 shows two half cross-sections taken on lines q–r and s–t of FIGURE 1, respectively;

FIGURES 5 and 6 show half longitudinal sections of two other embodiments of connector according to this invention; and FIGURES 7, 7a, 7b, and 8 show longitudinal and cross-sections of embodiments of the type illustrated in FIGURE 6 but further comprising conductors and electric connections.

The cooperation of the various elements of a connector according to this invention will be first described in detail with particular reference to FIGURES 1–4. The tubing sections which have to be connected comprise essentially a central tubular core 1 made of a tight flexible material (elastic or plastic material) wherein is embedded a sheathed electric conductor 2, said core being surrounded with at least one reinforcement consisting, for instance, of two layers 3 and 4 of binding wires or wire strands, wound and interlaced so as to constitute a helical network and covered with an external protective sheath 5. The connector according to this invention consists of two connector members formed by building up the end of each tubing length so that each connector member may be secured to that of an adjacent tubing length, in related assembly.

In order to fix a connector member to the end of the tubing length, an ending collar 6 and a cylindrical locking sleeve 7 are drawn on the tubing end which is thereafter stripped on a certain length by cutting off the external sheath 5. The binding layers 3 and 4, helically wound on the core, being thus freed, tend to move apart therefrom. The tightening sleeve 8 is then forced by its end of smaller thickness between the core and the binding layers. This tightening sleeve comprises essentially A substantially cylindrical part of small thickness ending with a bevelled edge having a rounded end 10 and a part of higher thickness 11 the internal diameter of which increases so as to form a frustum of a cone of small slope having an annular abrupt change in diameter, or groove 12, and A substantially cylindrical part of large diameter 13 comprising a circular inner recess 14 provided for housing the electric connections.

The wires or wire-strands of the binding layers are folded at their ends and are so placed as to leave only a small free space between the curved ends S of the folded wires or wire-strands and the circular shoulder 16 formed between the cylindrical part of small thickness 9 and the part 11 of higher thickness of the tightening sleeve.

The locking sleeve 7 is then screwed on the tightening sleeve by means of the thread 17, thereby confining the folded wires or wire-strands into the cylindrical cavity 18 of substantially triangular section. This cavity is then filled up through the communicating cavity 19 with a liquid substance susceptible to be brought to a solid state, such as a molten alloy or resin which, after hardening, makes the wires or wire-strands solid with the sleeves 7 and 8. The sleeve 7 is further provided inside with recesses in the form of longitudinal grooves (g on FIGURE 4) intended to preclude any slip of the hardened alloy or resin on the internal wall of the sleeve 7, thereby securing a satisfactory transmission of the torsional strains between the binding layers of the tubing and the sleeve 7.

There is thus forced into the tubular core an internal locking socket 20 of the same internal diameter, by the conical part 21 thereof, of slight slope, ending with a bevelled edge 22 of higher slope, so as to prevent any flaw in the tubular core. Said locking socket is also provided with one or more circular grooves 26 so as to improve the tightening, between the same and the tubular core made for instance of rubber or neoprene.

Similar grooves are provided for the same purpose on the conical part of the tightening sleeve. The locking conical socket is forced into the tubular core until introduction therein of its whole conical length which corresponds, for instance, to the length of wires or wire-strands which has been folded into the cylindrical cavity 18. The inner recess 14 has been preliminarily provided with an interiorly threaded lock nut 23 intended to be screwed on the threading 24 of the internal locking socket which is forced into the core, for instance by means of a jack, by mere longitudinal displacement in a direction parallel to its axis, the lock nut being screwed progressively in proportion to the penetration of the internal locking socket so as to preclude any retiring movement of the latter.

At its final place as shown in FIGURE 1 the tubular core is compressed on a certain length thereof between the locking conical socket and the corresponding conical part of the tightening sleeve. The cylindrical grooves 12 and 26 provided on the outer surface of the locking conical socket and on the inner surface of the conical part of the tightening sleeve, respectively, securely hold the tubular core in position by precluding any possible retirement of the same from the annular space housing it, as defined between the locking conical socket and the tightening sleeve.

There is also provided a sealing means between the opposite cylindrical end of the locking socket and the corresponding end of another locking socket integral with another connector member provided on another tubing length.

For the coupling of two tubing lengths the locking sockets of the respective connector members thereof may be advantageously provided with complementary ending parts fitting to each other (male and female parts) and sealing means therebetween consisting for instance of a toric gasket 27.

By this way the recess 14 will be protected from leakage of the fluid conveyed through the tubing and, for instance in the case of use of the tubing in drilling operations, the recess 14 will be completely sealed with respect to the drilling mud circulating inside and outside the connector. Moreover the electric insulation may be enhanced by coating the inner surface of the recess 14, comprising a part of the external surface of the locking socket 20 and the external surface of the lock nut 24, with an insulating tape 28. As illustrated in FIGURE 2, showing a cross-section along line x–y of FIGURE 1, the recess 14, as formed within the sleeve 8, opens outwardly by means of three wide windows 30, 31 and 32 through which the electric connecting elements may be easily positioned into said recess.

According to the arrangement shown in FIGURE 2, the electric conductors are distributed in three groups, each corresponding to one phase, all the conductors of each group being connected to a corresponding connecting element 33, 34, and 35 having the shape of an annular sector, for instance by directly fixing the conductor ends on a lateral face of the connecting element (as shown by reference 34 of the connecting element 33 on FIGURE 1). The opposite face of each connecting element is provided with one or more connecting terminals (two in the arrangement illustrated in FIGURE 2), solid with a male or female contact plug secured to the ending part of the connector member.

In the embodiment illustrated in FIGURE 1 the upper connector member is provided with a female plug 36 surrounded by an insulating sleeve 37, both housed within the tightening sleeve 8 at the end part thereof. The lower connector member comprises a male plug 38 also surrounded by an insulating sleeve 39.

FIGURE 3 shows a cross-sectional view of the connector along line u–v of FIGURE 1, where the six plugs 36, 36a, 40, 40a, 41, and 41a are associated in pairs to the three connecting elements, respectively, as shown by the annular sectors 33, 34, and 35 on FIGURE 2, each corresponding to one of the three phases. Centering pins 15, 15a, and 15b are provided between the pairs of plugs so as to preclude any torsional strain on the plugs during the coupling of the connector members. These centering pins are provided on the connector members comprising male plugs and are preferably chosen slightly longer than the latter so as to avoid any risk of deterioration of the plugs when the connector members are not joined. Corresponding recesses are provided for housing said centering pins, in the connector members comprising female plugs.

The coupling of two connector members is effected by positioning the centering pins into the corresponding recesses, after the external sleeve 42 has been drawn on one of the two connector members and the associated tubing end, and the covering sleeves 43 and 43a have been screwed on the threads 44 and 45 provided therefor on the tightening sleeves 8 and 8a.

These covering sleeves close the windows of the recesses 14 and 14a containing the electric connections. However, they are provided with two ports 46 and 46a through which an insulating matter may be run into the recesses 14 and 14a, respectively, whereby the conductors and electric connecting elements are imbedded therein. There is thus achieved a satisfactory insulation so that any contact of the conductors with a possible fluid leakage from the exterior of the connector is avoided. After the covering sleeves 43 and 43a have been placed, there are introduced into recesses provided therefor on the peripheral part of the locking sleeves 7 and 7a, fixing keys 47 and 47a to be used for the transmission of torsional strains from one connector member to the other. Such transmission of the torsional strains is effected, simultaneously with that of the traction strains, through two cover shells, half cylinder shaped, 48 and 49 provided at each end thereof with a half ring-like protrusion 50, 50a, and 51, 51a adapted to fit with a half circumferential groove of corresponding shape provided in the locking sleeves 7 and 7a, and further comprising recesses of a shape and size adapted to the housing of that part of the fixing keys overlapping the external cylindrical surface of the locking sleeves.

These fixing keys, thus made solid with both the locking sleeves and the cover shells, provide for the transmission of the torsional strains from the locking sleeve of one connector member to the cover shell and from the latter to the locking sleeve of the other connector member, from where they are transmitted by means of the longitudinal grooves g (FIG. 4) to the binding layers of the flexible tubing.

The traction strains are directly transmitted from one locking sleeve to the other and consequently from one tubing section to the other through the intermediary of the half ring-like protrusions of the shells.

The sealing against fluid penetration from the exterior as well as the blocking at their place of the two shells are simultaneously achieved by use of an external cylindrical sleeve 42, provided at its two ends with threads adapted to engage the threads of two ending collars 6 and 6a, respectively, which are screwed thereon. Moreover, in order to complete this sealing against penetration of fluid from the exterior, there are provided toric gaskets 52, 52a, 53 and 53a each within a circumferential groove adapted to house the same, arranged respectively in the locking sleeves 7 and 7a and the tightening sleeves 8 and 8a.

In the case where the tubing sections which have to be connected together comprise a reinforcement for resistance to internal pressure, consisting for instance of two binding layers helically wound with reverse pitches, the cylindrical part 9a of small thickness of the tightening sleeve will be preferably introduced between the reinforcement for resistance to pressure (having the reference numeral 54 in FIGURE 1) and the binding layers of the reinforcement for resistance to traction 3a and 4a, the reinforcement 54 being cut off preliminarily to the required length.

In such a case it may be of advantage to provide a port 55 through the cylindrical part 9a of the tightening sleeve, giving way to the alloy or hardening resin introduced into the recess 18a, whereby the reinforcement 54 is better maintained in position.

FIGURES 5 and 6 illustrate other embodiments or arrangements of connectors for flexible tubings which do not comprise electrical conductors. They are particularly adapted for connection of tubing sections used in lieu of the conventional drill string in drilling operations carried out with a bottom turbine.

The connector members, in the arrangement illustrated in these figures, are not assembled by means of fixing keys and shells but by mere screwing. The essential constituting parts thereof are the same as those illustrated in FIGURE 1 and are designated by like reference numerals.

An inner recess being unnecessary in view of the absence of electric conductors, the free ending part 56 of the tubular core (FIGURE 5) is made solid with the tightening sleeve 8 by means of the alloy or the resin 57 run into the clearance formed between said ending part 56 and the corresponding part of the tightening sleeve 8. Moreover the sealing is enhanced between the internal locking socket 20 and the tightening sleeve 8 by means of a toric gasket 58.

In the embodiment shown in FIGURE 5, the connector member is provided with two adjacent circular cavities 50 and 60 for separately housing the folded ends of wires or wire-strands of each of the two binding layers forming the tubing reinforcement. These circular cavities are formed within the wall of the part 9b of the tightening sleeve which is introduced between the tubular core and the binding layers. The side walls 61 and 62 of said cavities are preferably inclined with a substantially steep gradient and the depth of the cavities must be sufficient for the housing thereinto of the folded ends of the wires or wire-strands of the reinforcement, said cavities being closed thereafter by means of a mere cylindrical locking sleeve 7b.

After this operation has been completed, an alloy or a resin is run into said communicating cavities so as to make the steel wires or wire-strands solid with the tightening sleeve 8. According to such an arrangement the traction strains are directly transmitted from the wires or wire-strands of the binding layers to the sleeve 8 which is directly secured to the corresponding sleeve of the other connector member by screwing.

FIGURE 5 further illustrates the use of another type of internal locking socket ending with a tubular part of small thickness which, after it has been forced into the tubular core on its whole length is widened at one or more separate places by mandrel, whereby a satisfactory sealing is achieved between the internal socket and the tubular core. As a matter of fact, due to the widening by mandrel of cylinder sections, like 63 and 64, the flexible material of which is comprised the tubular core (rubber or neoprene, for instance), is repelled aside from these sections, which results in an increase in the pressure applied by the end 56 of the tubular core on the alloy or the resin 57 filling the clearance between said core end 56 and the corresponding wall of the sleeve 8, whereby the sealing is improved.

FIGURE 6 shows another embodiment of the arrangement illustrated in FIGURE 5, according to which the tubular core is compressed between the tubular part of the locking socket, internal to the tubular core, and a co-axial metallic tube, external to the tubular core, by reducing the diameter of the external tube 65 thereby achieving a kind of crimping, and by widening by mandrel the tubular part of the locking socket. A locking screw 66 is further provided in order to prevent any relative rotation of the internal locking socket with respect to the sleeve 8.

FIGURE 7 illustrates an arrangement simliar to that of FIGURE 6 but further comprising a circular cavity 14b for electric connections of the conductors at their outlet from the tubular core. This cavity 14b is built up between an external sleeve 67 screwed on the sleeve 8 and a coupling sleeve 68 secured both to the sleeve 8 and to the external sleeve 67. This coupling sleeve 68 is provided with a port 76 for the passage of the conductors used for the electric connection to, for instance, drill collars or an electric motor which is fed through a co-axial plug 69.

The sealing of the cavity 14b against possible fluid penetration between the tubular core and the locking socket on one hand and between the external tube 65 and the tubular core on the other hand, is achieved by means of a sealing ring 71 made of an elastic flexible material and comprising separate holes for the passage of each conductor surrounded with its insulating sheath, these holes having a diameter slightly smaller than that of the sheathed conductors which must be forced therethrough.

FIGURE 7a illustrates a cross-section of the sealing ring along line I—I of FIGURE 7. The sealing ring will be chosen of an inner diameter slightly smaller than the corresponding external diameter of the locking socket so as to be pressed against the latter, and the outer diameter of the sealing ring will be chosen slightly greater than the inner diameter of the external tube 65 so that the sealing ring be compressed between the external tube and the locking socket, thereby achieving its sealing effect.

At their outlet from the holes of the sealing ring, the conductors are passing through corresponding holes of a ring like protrusion 72 of the locking socket 20b, the cross-section of which along line II—II of FIGURE 7 is shown in FIGURE 7b. This ring-like protrusion acts as a side bearing for the sealing ring and is provided with separate holes for the passage of the sheathed conductors, registering with the corresponding holes of the sealing ring. This ring-like protrusion is also provided with fastening-positioning means 77 (FIGURE 7b) for the external tube 65.

Into the free annular space 78 formed between the end of the tubular core and the sealing ring, there is advantageously run in the liquid state an alloy or a hardening resin which are thereafter brought to the solid state so as to enhance the sealing.

At their outlet from the ring-like protrusion 72 the conductors pass through an annular space 73 formed between the ending parts of the tube 65 and of the locking socket, said annular space communicating with the cavity 14b housing the connecting elements.

In order to further enhance the sealing there may be run an alloy or a hardening resin into said annular space 73 as well as into the free space 74 between the external tube 65 having its diameter reduced by crimping and the internal wall of the sleeve 8. The alloy or resin may be run into said space 74 for instance through the external port 75 communicating therewith.

The arrangement shown in FIGURE 8 is similar to that of FIGURE 7, except that the conductors of the flexible tubing are intercalated between the wires or wire-strands of the binding layers. In such a case holes 70 must be provided through the sleeve 8 for the passage of the conductors from the cavities formed between the sleeve 7b and the part 9b of the tightening sleeve, to the circular cavity 14b housing the connecting elements, each conductor being separately protected against any fluid contact by means of individual sealing joints located in separate housings 79 adapted therefor in the sleeve 8.

It will be understood that, while there have been given herein certain specific examples of the practice of this invention, it is not intended thereby to have this invention limited to or circumscribed by the specific details of materials, proportions or conditions as herein specified or shown in the accompanying drawings, in view of the fact that the invention may be modified according to individual preference or conditions without necessarily departing from the spirit of this disclosure and the scope of the appended claims.

What is claimed is:

1. Connector member for flexible conduit sections comprising a tubular core of flexible material having an end and wherein electrical conductors are embedded and at least one reinforcement consisting of two binding layers of metallic wires, resistant to traction strains, said connector member comprising (a) a tightening sleeve having an internally cylindrical part located between the tubular core and the adjacent binding layer and the external surface of which is provided with two circular protrusions defining two annular grooves, (b) a locking sleeve surrounding an end of the tightening sleeve and coaxial therewith and forming with the two annular grooves thereof two circular cavities each housing folded ends of said metallic wires of a separate one of said two binding layers, said cavity containing said wire ends being filled up with a substance solidified in situ, (c) an internal locking socket having a ring-like protrusion ending in a metallic tubular part of relatively small thickness as compared to the tubular core and having a diameter at most equal to the internal diameter of said tubular core, (d) an annular recess formed between an annular member integral with said tightening sleeve and another annular member integral with said internal locking socket, said annular recess housing electric connections, and said electrical conductors in said tubular core passing through said ring-like protrusion of said locking socket and sealed from said recess containing said electrical connections, and (e) an external metallic tube of relatively small thickness, as compared to the tubular core and co-axial with the tubular ending part of said internal locking socket and forming therebetween a cylindrical annular space the thickness of which is at most equal to that of said tubular core, said core being compressed between said tube and said tubular part of said internal locking socket, only one part of said annular space being filled with said tubular core, the other part thereof constituting a free space, whose communication with the recess housing said electric connections is closed by said ring-like protrusion of said internal locking socket having separate holes receiving each conductor, the sealing between said free space and the annular recess housing said electric connections comprising a sealing ring of an elastic flexible material bearing on the side of said ring-like protrusion, and having an annular thickness greater than that of the latter and compressed between said external tube and said tubular ending part of said internal locking socket, said sealing ring having separate holes of a diameter smaller than that of said conductors and passing through said corresponding holes of said ring-like protrusion of said internal locking socket, registering with the holes of said sealing ring.

2. Connector member according to claim 1, wherein said free space between the end of said tubular core and said sealing ring is filled with a substance solidified in situ.

3. Connector member according to claim 1, wherein said annular space formed between the recess housing said electric connections and the ring-like protrusion of said internal locking socket is filled with a substance solidified in situ.

4. Connector member between ends of flexible conduit sections which comprise a tubular core of flexible material having two ends and wherein electrical conductors are embedded, a reinforcement resistant to traction strains constituted by at least two binding layers of metallic wires surrounding said core, said metallic wires having folded ends at the respective ends of the flexible conduit sections, said connector member comprising;

(a) a tightening sleeve having an internally cylindrical end the external surface of which is provided with at least two circular protrusions defining annular grooves, said end being placed between said tubular core and said binding layers surrounding the same;

(b) a locking sleeve surrounding said end of said tightening sleeve and coaxial therewith, and forming with said annular grooves annular cavities each housing the folded ends of said metallic wires of a separate one of said binding layers, said wire ends containing cavities filled with a substance solidified in situ embedding said wire ends;

(c) a locking socket having a ring-like protrusion and ending in a metallic tubular part of relatively small wall thickness as compared to the tubular core and having an external diameter at most equal to the internal diameter of said tubular core, said tubular part of said locking socket being disposed internally of said tubular core and providing a free space between one of said core ends and said ring-like protrusion, said ring-like protrusion having separate holes receiving said electrical conductors of said tubular core;

(d) a metallic tube of relatively small thickness as compared to the tubular core and surrounding said tubular part of the internal locking socket and coaxial therewith, forming therewith an annular space the thickness of which is at most equal to that of said tubular core, said metallic tube forming with said free space between said core end and said ring-like protrusion an annular free space, said metallic tube and said internal locking socket being crimped and gripping said tubular core therebetween, whereby the diameter of said metallic tube is reduced by places and the diameter of said tubular part of said internal locking socket is increased by places;

(e) an annular member integral with said locking socket and an annular member integral with said tightening sleeve forming therebetween an annular recess separated from said free space by said ring-like protrusion and housing electrical connections with said electrical conductors passing therethrough, and said electrical conductors in said tubular core passing through said ring-like protrusion of said locking socket and sealed from said recess containing said electrical connections.

5. Connector member according to claim 4, wherein there is provided a sealing ring sealing between said annular free space and said annular recess housing said electrical connections, said sealing ring being an elastic flexible material and having a thickness at least equal to that of the tubular core and being located in said annular free space so as to be compressed between said metallic tube and said metallic tubular part of the locking socket and abutting against said ring-like protrusion, said sealing ring having separate holes having a diameter smaller than that of the conductors and registering with the adjacent holes of said ring-like protrusion of said locking socket and forming therewith a passage for said conductors.

References Cited by the Examiner

UNITED STATES PATENTS

| | | | |
|---|---|---|---|
| 500,822 | 7/93 | Strauss | 340—320 X |
| 696,702 | 4/02 | Weitz | 340—320 X |
| 749,633 | 1/04 | Seeley | 340—320 X |
| 2,178,931 | 11/39 | Crites | 339—16 |
| 2,220,785 | 11/40 | Goodall | 285—149 |
| 2,237,490 | 4/41 | Knowland | 285—149 |
| 2,277,397 | 3/42 | Graham | 285—149 X |
| 2,302,856 | 11/42 | Hamon | 285—91 |
| 2,479,483 | 8/49 | Ekleberry | 285—149 |
| 2,906,502 | 9/59 | Smith | 175—56 X |
| 2,940,778 | 6/60 | Kaiser | 285—149 |

CARL W. TOMLIN, *Primary Examiner.*